UNITED STATES PATENT OFFICE.

CHARLES S. HASTINGS, OF NEW HAVEN, CONNECTICUT.

PRISM-TELESCOPE.

No. 918,147.  Specification of Letters Patent.  Patented April 13, 1909.

Application filed December 2, 1908. Serial No. 465,897.

*To all whom it may concern:*

Be it known that I, CHARLES S. HASTINGS, a citizen of the United States, residing at New Haven, in the county of New Haven and State of Connecticut, have invented a new and useful Improvement in Prism-Telescopes; and I do hereby declare the following to be a full, clear, and exact description of the same.

My invention relates to an improvement in prism telescopes, the object being to improve them in sharpness of definition and therefore in optical power, by correcting the existing errors in their images by introducing equal and opposite errors in the objective.

With these ends in view my invention consists, first, in a telescope having the ratio of the power of the flint elements to that of the crown elements in the object glass reduced numerically by an amount, depending upon the dimensions and material of the prismatic erector, so as to produce a sensibly achromatic image; second, in a telescope having the ratio of the power of the flint elements to that of the crown elements in the object glass reduced numerically by an amount, depending upon the dimensions and material of the prismatic erector, so as to produce a sensibly achromatic image, and also having the sum of the spherical aberrations of all the elements of the object glass such as to sensibly balance, or eliminate, that introduced by the prismatic erector.

In order that my present invention may be better understood, I shall preface my description of it by a brief reference to the subject of aberrations in astronomical and terrestrial telescopes, taking occasion to define the meaning of some of the terms to be subsequently employed in the disclosure of my particular invention.

An ordinary (astronomical) telescope consists of an object glass (objective) used to form a well defined image of distant objects, and an eye piece (ocular) which is employed to form an image of the focal plane at a distance suitable for distinct vision by the observer. In order to secure satisfactory images from the objective, it is found necessary to make it of at least two kinds of glass, ordinarily known as crown and flint glasses, although there is no theoretical restriction of the total number of lenses which may be used; the only necessary condition is that the sum of the powers of the flint lenses shall be negative and shall bear a fixed ratio to the sum of the powers of the crown lenses which must be positive. The ratio is chosen so that the prismatic colors always attendant upon refraction shall be reduced so far as not to be injurious to the sharpness of vision. An objective so constructed is called an achromatic objective. An objective constructed in accordance with this principle alone, however, would not, in general, be a good one; for it would be found that images of distant objects formed by the outer zones of the objective would not be in the same plane as those formed by zones nearer the center. An error of this kind is styled spherical aberration. It is, however, possible to so adjust the forms of the individual lenses (and indeed, in an indefinitely great number of ways) that this defect is practically eliminated. An objective conforming to this condition is called aplanatic. Images formed by objectives which conform to both the conditions defined are called achromatic and aplanatic images.

The instrument described above would give inverted vision, hence it is ordinarily used only in astronomical instruments where this feature is not inconvenient. When erect images are desired they can be secured in two ways. In the commoner method the ocular is replaced by a system of lenses which by itself gives an inverted image, so that two inversions yield erect vision. This system is called a terrestrial ocular, and the whole instrument is styled a terrestrial telescope to distinguish it from the simpler astronomical telescope. A second method, invented by Porro, has come into extensive use in recent years. By successive reflections from plane surfaces, ordered in a manner well understood by opticians, erect vision is obtained. The chief advantages of this method over the former are, first, that it makes a much shorter instrument than the ordinary terrestrial telescope; and, second, that it is easier to secure large fields of vision. Telescopes in which use is made of Porro's invention may be called, in accordance with a common practice, prism telescopes. The second method of making erecting telescopes, however, has one serious fault. Critical users of such instruments have found them notably inferior in sharpness of definition, and therefore in optical power, to astronomical telescopes of like size, this inferiority becoming more manifest with higher magnification.

The object of my invention as I may now re-state it, is to improve prism telescopes in sharpness of definition, and therefore in optical power, whereby the objections hitherto believed to be inseparable from them are overcome. With the end in view of overcoming the objections referred to, I have made a series of investigations and discovered that the prisms employed in prism telescopes inevitably produce errors in the images so that the same are no longer either achromatic or aplanatic, the magnitude of the errors depending upon the dimensions and material of the erecting prims. I have also found that these errors may be corrected by designedly introducing equal and opposite errors in the objective. In other words, the inevitable errors proceeding from the erecting prisms are nullified by the introduction of errors equal in extent and opposite in character in the objective. The errors introduced into the objective are determined by reducing the numerical ratio of the power of the flint elements of the objective to that of the crown elements of the objective, and by altering the form of one or more of the lenses so that a spherical aberration is introduced equal and opposite to that imposed on the focal image by the prisms. These are matters of mathematical determination and will be readily understood by persons familiar with this art. As an example, however, of my procedure, I may add that in a certain objective of nearly perfect definition I found the ratio of the sum of the powers of the flint elements to that of the crown elements, was —0.724; in order to make this objective perform perfectly with a certain set of prisms, it was necessary to change this ratio to —0.711.

I would have it understood that I do not limit myself to any formulæ for the reason that the amounts of errors to be introduced into the objective for the correction of the errors in the images inevitably produced by the erecting prisms, will depend upon the dimensions and materials of the prisms. In any case the fundamental principle of designedly introducing equal and opposite errors in the objective to nullify the aberrations inevitably produced in the erecting prisms, will always be present in any application of my invention to the correction of prism telescopes.

I claim:—

1. A system of lenses for prism telescopes into the objective of which an error is introduced equal in extent and opposite in character to that produced by the erecting prisms, said error being introduced by reducing the ratio of the power of the flint elements to that of the crown elements in said objective by an amount depending upon the dimensions and material of the prismatic erector, so as to produce a sensibly achromatic image.

2. A system of lenses for prism telescopes into the objective of which an error is introduced equal in extent and opposite in character to that produced by the erecting prisms, said error being introduced by reducing the ratio of the power of the flint elements to that of the crown elements in said objective by an amount depending upon the dimensions and material of the prismatic erector, so as to produce a sensibly achromatic image, and also having the sum of the spherical aberrations of all the elements of the object glass such as to sensibly balance, or eliminate, that introduced by the prismatic erector.

In testimony whereof, I have signed this specification in the presence of two subscribing witnesses.

CHARLES S. HASTINGS.

Witnesses:
CLARA L. WEED,
GEORGE DUDLEY SEYMOUR.